Dec. 12, 1961     F. HAUSER     3,012,444
TIMING DEVICE
Filed March 24, 1959
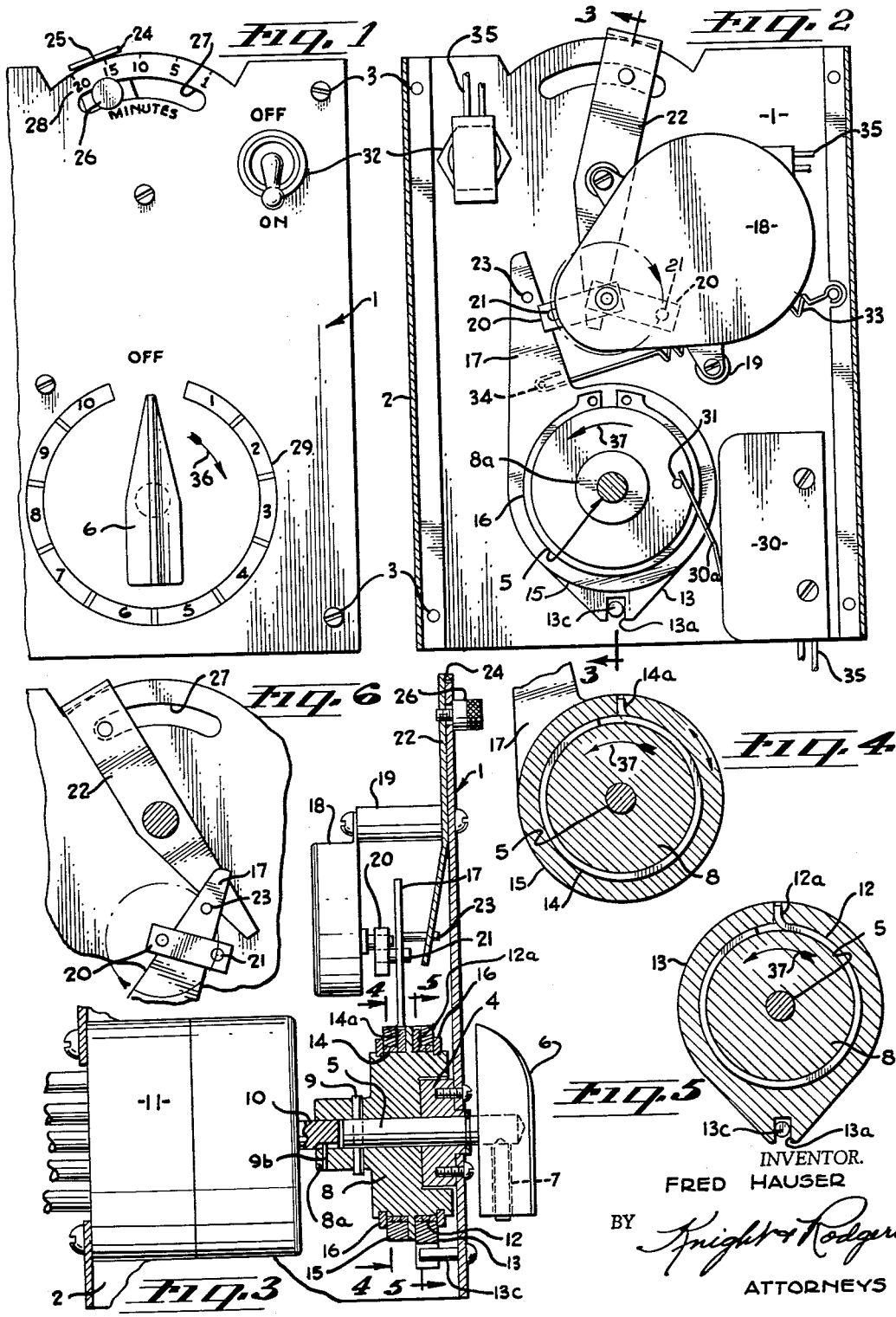
INVENTOR.
FRED HAUSER
BY Knight & Rodgers
ATTORNEYS United States Patent Office 3,012,444
Patented Dec. 12, 1961

3,012,444
TIMING DEVICE
Fred Hauser, 1544 Midvale Ave., Los Angeles 24, Calif.
Filed Mar. 24, 1959, Ser. No. 801,638
6 Claims. (Cl. 74—125)

This application relates generally to timing devices and concerns particularly timed intermittent motion drives suitable for various purposes, such as advancing distribution valves of automatic lawn sprinkling equipment. In applications of this type a timing device according to the present invention drives multiple ported pilot type selector valves, rotary switches and the like with predetermined time sequence.

A general object of the invention is to render such apparatus adaptable for different installations in which time intervals differ widely.

A more specific object of the invention is to enable changes in timing intervals to be made readily.

A further object of the invention is to permit manual advancement of the timing shaft.

Other and further objects, features and advantages of the invention will become apparent as the description proceeds.

In carrying out the invention in accordance with a preferred form thereof, the shaft of a device to be rotated intermittently, such as a selector valve shaft, or a rotary switch, has connected thereto a drum carrying a pair of one-way clutches, one connected to a stationary member to prevent reverse rotation of the drum and the other adapted to be actuated by an oscillating member driven in time sequence, such as a rotating crank driven by a synchronous timing motor. Means are provided for varying the throw of the oscillating member in order to provide different timing adjustments.

A better understanding of the invention will be afforded by the following detailed description considered in conjunction with the accompanying drawing in which:

FIG. 1 is a fragmentary front elevation of the timer.

FIG. 2 is a rear elevation of the timer disclosing the complete mechanism except for the omission of a distributor valve to be driven by the timer.

FIG. 3 is a vertical cross-section taken on line 3—3 of FIG. 2, showing connection to a rotary selector valve.

FIG. 4 is a vertical section taken on line 4—4 of FIG. 3.

FIG. 5 is a vertical section taken on line 5—5 of FIG. 3.

FIG. 6 is a fragmentary rear elevation with the motor removed and showing the timing arm in the one-minute position.

Like reference characters are utilized throughout the drawing to designate like parts.

Referring to the drawings in more detail, the embodiment of the invention illustrated constitutes a timer having a front plate 1 upon which all the mechanism is mounted. This plate in turn may be fastened to the arms of a U-shaped bracket 2 (FIGS. 2 and 3) by means of screws 3. Mounted upon the rear of the plate 1 is a bearing 4 in which an operating stem 5 is rotatably mounted. Fastened to the front projection of the stem 5 in front of plate 1 is a knob 6, rotatably adjustable on the shaft by means of a set screw 7. On the rear projection of the stem 5 is mounted clutch retaining drum 8 which is non-rotatably pinned to shaft 5 by pin 9 passing through hub 8a of the drum. A second pin 9b pressed into the hub of said drum serves as a driving key for drivingly connecting the drum to the operating shaft 10 of mechanism which is to be rotationally advanced intermittently, e.g., a distributor valve 11 which may be of any suitable type. As shown, the shaft 10 projects partially into the bore within drum 8 which houses the stem 5.

On the periphery of the drum 8 are mounted two over-running or one-way clutch assemblies, one consisting of a helical spring 12 and an anchor ring 13, and the other of a helical spring 14 and a driving ring 15. Both of these clutch assemblies are retained in place on drum 8 by snap rings 16 in such a manner that they may freely rotate on the drum 8. The helical springs 12 and 14 have hooked ends 12a and 14a, respectively. The end 12a of the spring 12 engages a radial slot in the anchor ring 13 and the end 14a of the spring 14 engages a similar radial slot in the driving ring 15 (see FIGS. 4 and 5).

The springs 12 and 14 are preferably of rectangular cross section and are formed in such a way that the coils snugly embrace the peripheral surface of the drum 8. They are wound around the drum in the same direction from the hooked ends 12a and 14a. The cylindrical inside surfaces of the anchor ring 13 and the driving ring 15 are fitted to the peripheries of the respective springs with only a slight clearance.

The anchor ring 13 is prevented from rotating by means of a fixed pin 13c mounted on front plate 1 and engaging a slot 13a formed in the periphery of ring 13. The driving ring 15 is provided with a radial drive arm 17.

My invention is not limited to the construction described above for either or both of the over-running clutch assemblies. Other known clutch constructions that are suitable may be substituted if desired. For example, a well-known construction is one in which a ball or cylinder riding on an inclined cam surface is pressed against a cylindrical surface by a spring to lock a driving member to a driven member in one direction of rotation only.

A constant speed drive motor 18 such as a synchronous alternating-current electric motor is also mounted to the rear of the front plate 1 by means of spacers 19. The motor output shaft is fitted with a crank arm 20 which carries a crank pin 21. Arm 20 rotates in a vertical plane parallel to but laterally offset from the vertical plane in which arm 17 oscillates, as may be seen in FIG. 3. Pin 21 projects into the path of arm 17 to engage the latter as will be further described. Pivotally mounted under one of the motor spacers 19 is a timing arm 22, which has one end bent inwardly away from plate 1 to a position where it lies in the path of and strikes a pin 23 carried by arm 17 of the driving ring 15. The upper end of the arm 22 has a short forward projection 24 which has engraved on it an index line 25. A thumb screw 26 serves to retain the arm 22 fixed in a selected position. The thumb screw passes through an arcuate slot 27, cut into the front plate 1, that permits partial rotation of the arm 22 around its pivot point.

Numerals 28 imprinted on the front panel along the slot 27 serve to indicate the time it takes the pointer of the knob 6 to pass over one of the segments 29 imprinted on the front plate 1.

A switch 30 has an actuating arm 30a that is operated by a pin 31 projecting rearwardly from the rear face of drum 8 and moved thereby in a circular path. Switch 30 is interposed in a circuit schematically represented by conductors 35 supplying power from a current-source to motor 18. The switch is a normally closed switch and automatically shuts off the motor 18 at the end of one complete revolution of drum 8, as will be explained.

A manual shut-off switch 32 in series with switch 30 may also be provided.

The timer operates as follows:

It may be started automatically by a conventional time clock (not shown) with a switch mechanism actuated daily or at other preset intervals for by-passing the switch 30 to energize motor 18 for a short period of time, that is until the pin 31 has passed off of the switch actuator arm 30a; or it may be started manually simply by rotating the knob 6, FIG. 1, clockwise to the beginning of the first segment 29 which has the same result. This starts the motor 18 running, rotating the crank arm 20 in a clockwise direction, viewed in FIG. 2. The tension spring 33 attached at one end to a fixed pin on front plate 1 and at the other end to the pin 34 pressed into the arm 17, urges the latter arm continuously against the crank pin 21, thereby rotating the driving ring 15 in a clockwise direction looking at FIG. 4. This rotation is in a direction to loosen the spring 14 from its grip on the periphery of the drum 8 and no torque is transmitted by spring 14, to the latter, except a relatively small amount due to mechanical friction. Any drag resulting from friction would tend to rotate the drum 8 also in a clockwise direction. Any such rotation of drum 8 causes the coil spring 12, FIG. 5, to tighten and thereby to transmit a clockwise torque to the anchor ring 13. This ring, however, is prevented from rotating by virtue of the engagement with pin 13c. The drum 8 therefore remains stationary and clutch spring 14 turns about the drum.

It is also within the scope of my invention to utilize a frictional brake means to hold drum 8 against rotation in lieu of the over-running clutch mechanism described. For example, when the mechanism of distributor valve 11, or other driven device has sufficient internal friction to hold shaft 5 against rotation while arm 17 is being returned, the anchor ring 13 in the cooperating clutch spring 12 may be omitted. Likewise a friction producing element of any suitable design may be substituted, if desired, although such mechanism ordinarily is not favored since it adds to the load encountered by arm 17 during the advance stroke.

As the driving ring 15 and its arm 17 rotate in a clockwise direction from the position of FIG. 2 while following the crank pin 21 under the urging of spring 33, pin 23 projecting horizontally is ultimately intercepted by the timing arm 22. Engagement of pin 23 with arm 22 stops the rotation of the driving ring 15. The crank 20, however, keeps on rotating. During the next half revolution of crank 20 the crankpin 21 again contacts the arm 17, and rotates the driving ring 15 and its arm in counter clockwise direction about shaft 5, viewed as in FIG. 2, of FIG. 4. The coil spring 14 is now tightened around the drum 18 thereby gripping the drum to transmit rotation to the latter, as well as to the knob 6 and the shafts 5 and 10 in the direction shown by arrows 36 and 37 respectively in FIGS. 1 and 2. Thus the shaft 5 is intermittently driven since it is rotated for only a portion of each full revolution of arm 20.

In order to change the angle through which arm 17 oscillates when driven by crankpin 21 and thereby change the interval of time required for the knob 6 to pass over one of the segments 29, the timing arm 22 may be moved by means of the thumb screw 26 as shown in FIG. 1 and locked in selected position by tightening the screw. Thus, any time increment for passing over a segment 29 may be had within the maximum and minimum, as determined by the motor speed selected. In FIG. 1 the minimum is indicated as 1 minute based on an assumed speed of the output shaft of motor 18 and arm 20 of one revolution per minute.

FIG. 6 illustrates the position of the timing arm 22 and the extension 17 in its extreme position resulting in the shortest time increment. Here pin 21 on arm 20 engages arm 17 at the earliest time in the revolution to start counter clockwise return of arm 17 from the position of FIG. 6 to the position of FIG. 1. Hence the maximum angular motion of shaft 5 for each revolution of arm 20 is secured under these conditions.

A given angular movement of shaft 5 is required for knob 6 to pass over each segment 29. As the counter clockwise motion of arm 17 and driving ring 15 is reduced for each revolution of arm 20, a correspondingly larger number of revolutions of arm 20 is required to rotate drum 8 and shaft 5 through an arc equal to one segment 29. A longer time is required since arm 20 rotates at a constant speed.

When timing arm 22 is in the position of FIG. 2, each rotation of arm 20 moves arm 17 and ring 15 counter clockwise for a small fraction of the arc of one segment 29. Assuming that sixteen revolutions of arm 20 are required to move drum 8 through an arc equal to one segment 29, the time for transit of each segment is sixteen minutes as indicated on scale 28. A maximum of twenty minutes for each transit is designed into the mechanism. These intervals indicate the time selector valve 11 may be in any one position before going to the next position, assuming the valve is of a type commonly used in automatic lawn sprinkling systems.

At the end of a complete revolution of the shaft 5 the motor is stopped by the pin 31 striking arm 30a of the switch 30 and opening the switch to de-energize motor 18. One revolution of shaft 5 is a complete cycle of operation and causes knob 6 to traverse all segments 29 or valve 11 to pass through all positions.

From the foregoing it should also be understood that the knob 6 and its attached members may any time be advanced manually in clockwise direction looking at FIG. 1 since both clutch springs 12 and 14 do not now grip drum 8, leaving it free to be turned.

The distributor valve 11 represents one of many devices that may be driven. The driven device may be for instance a rotary step switch or other device that is rotationally advanced intermittently, and where it is desired to vary the timing intervals.

It is understood that deviations from the construction shown may be developed without departing from the spirit of the invention or the scope of the appended claims.

I claim:

1. A timer for use with a shaft to be driven intermittently, comprising in combination:

a drum secured to the shaft, a pair of helical springs embracing the drum, an anchor ring, a driving ring, each spring having an end secured to one of said rings, means for preventing rotation of one of said rings, the other having a radially extending arm free to swing through an arcuate path, a motor having a crank rotating in the path of said arm, and means resiliently biasing said arm toward said crank, whereby rotation of the motor produces oscillatory motion of the arm, alternately tightening and loosening the springs to rotate the drum with the arm and one spring upon oscillation in one direction while the other spring tightens on reverse direction oscillation to hold the drum and cause intermittent timed motion of the timer shaft.

2. A timer, as in claim 1, having a limit stop restricting motion of the arm in the direction produced by said resilient biasing means.

3. A timer, as in claim 2, in which a scale calibrated in time units is provided and the limit stop comprises an adjustably mounted lever movable along said scale.

4. An intermittent drive assembly comprising in combination a mounting plate, a bearing plate secured to the mounting plate, a recessed drum having a coaxial cavity adapted to fit around said bearing plate, a shaft, a motor having an axis perpendicular to the mounting plate and parallel to said shaft, an eccentric pin carried by the motor parallel to the motor axis, a driving ring, means thereon engaging said drum for rotation in a pre-determined direction and releasing in the event of rotation in the opposite direction, an arm parallel to said mounting plate in the path of said eccentric pin, a second pin mounted in said arm mounted perpendicular to said mounting plate, a time-adjusting lever bent into the path of the pin in said arm, a pivot for said adjusting lever, and means for adjustably securing said adjusting lever with respect to angular movement about said pivot.

5. A timer for a shaft to be advanced intermittently and having a drum thereon comprising in combination:
- a spring friction overrunning clutch engageable with a smooth, cylindrical surface on the drum, said clutch including a driving arm oscillatable about said shaft and connectible to the drum through the clutch to rotate the drum in one direction;
- a continuously rotating crank moving over a path of constant radius and engageable with said driving arm to swing it in said one direction;
- spring means connected to the arm to return it in the other direction;
- and adjustable stop means engageable with the arm to limit the length of the return stroke and disengage the arm from the crank.

6. A timer as claimed in claim 5 which also includes brake means engaging the drum to prevent reverse rotation of the drum opposite to said one direction during the return stroke of said arm.

References Cited in the file of this patent

UNITED STATES PATENTS

| | | |
|---|---|---|
| 1,292,099 | Seymour | Jan. 21, 1919 |
| 1,629,420 | Starkey | May 17, 1927 |
| 2,373,186 | Isserstedt | Apr. 10, 1945 |
| 2,563,077 | Schwartz | Aug. 7, 1951 |
| 2,688,389 | Wittel et al. | Sept. 7, 1954 |
| 2,788,850 | Leuenberger | Apr. 16, 1957 |
| 2,888,986 | Naxon | June 2, 1959 |

FOREIGN PATENTS

| | | |
|---|---|---|
| 771,146 | Great Britain | May 27, 1957 |